US011935326B2

(12) United States Patent
Sun et al.

(10) Patent No.: US 11,935,326 B2
(45) Date of Patent: Mar. 19, 2024

(54) FACE RECOGNITION METHOD BASED ON EVOLUTIONARY CONVOLUTIONAL NEURAL NETWORK

(71) Applicant: Sichuan University, Chengdu (CN)

(72) Inventors: Yanan Sun, Chengdu (CN); Siyi Li, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 447 days.

(21) Appl. No.: 17/202,375

(22) Filed: Mar. 16, 2021

(65) Prior Publication Data

US 2021/0295019 A1 Sep. 23, 2021

(30) Foreign Application Priority Data

Mar. 19, 2020 (CN) .......................... 202010195004.5

(51) Int. Cl.
*G06K 9/00* (2022.01)
*G06K 9/66* (2006.01)
(Continued)

(52) U.S. Cl.
CPC ............. *G06V 40/172* (2022.01); *G06N 3/04* (2013.01); *G06N 3/086* (2013.01); *G06V 10/82* (2022.01); *G06V 30/19173* (2022.01)

(58) Field of Classification Search
CPC ................. G06V 40/172; G06V 10/82; G06V 30/19173; G06N 3/04; G06N 3/086
See application file for complete search history.

(56) References Cited

U.S. PATENT DOCUMENTS 9,704,045 B2 * 7/2017 Jonsson ............... G06V 10/764
10,769,414 B2 * 9/2020 Kumar ................. G06V 10/764
(Continued)

OTHER PUBLICATIONS

Kobayashi et al, A New Indirect Encoding Method with Variable Length Gene Code to Optimize Neural Network Structures, 1999, IEEE, IJCNN'99 International Joint Conference on Neural Networks Proceeding, pp. 4409-4412 (Year: 1999).*

*Primary Examiner* — Gregory M Desire
(74) *Attorney, Agent, or Firm* — Bayramoglu Law Offices LLC

(57) ABSTRACT

A face recognition method based on an evolutionary convolutional neural network is provided. The method optimizes the design of convolutional neural network architecture and the initialization of connection weights by using a genetic algorithm and finds an optimal neural network through continuous evolutionary calculation, thus reducing dependence on artificial experience during the design of the convolutional neural network architecture. The method encodes the convolutional neural networks by using a variable-length genetic encoding algorithm, so as to improve the diversity of structures of convolutional neural networks. Additionally, in order to cross over extended chromosomes, structural units at corresponding positions are separately crossed over and then recombined, thereby realizing the crossover of chromosomes with different lengths. In the environmental selection stage, the method first performs elitist selection, and then compares two groups of fitness values of the remaining individuals in the population for further selecting, which ensures the elitist and the diversity.

9 Claims, 2 Drawing Sheets

(51) Int. Cl.
  *G06N 3/04* (2023.01)
  *G06N 3/086* (2023.01)
  *G06V 10/82* (2022.01)
  *G06V 30/19* (2022.01)
  *G06V 40/16* (2022.01)

(56) References Cited

U.S. PATENT DOCUMENTS

| | | | |
|---|---|---|---|
| 11,069,033 B2 * | 7/2021 | Fang | G06N 3/045 |
| 11,108,771 B2 * | 8/2021 | Rose | H04L 63/0428 |
| 11,195,098 B2 * | 12/2021 | Chen | G06N 3/082 |
| 11,710,044 B2 * | 7/2023 | David | G06N 3/086 |
| | | | 706/25 |
| 2020/0097818 A1 * | 3/2020 | Li | G06N 3/08 |

* cited by examiner

FACE RECOGNITION METHOD BASED ON EVOLUTIONARY CONVOLUTIONAL NEURAL NETWORK

CROSS REFERENCE TO THE RELATED APPLICATIONS

This application is based upon and claims priority to Chinese Patent Application No. 202010195004.5, filed on Mar. 19, 2020, the entire contents of which are incorporated herein by reference.

TECHNICAL FIELD

The present invention relates to the technical field of face recognition, and more particularly, to a face recognition method based on an evolutionary convolutional neural network.

BACKGROUND

Face recognition refers to a technology capable of recognizing or verifying an identity of a subject in an image or a video. Compared with traditional biometric recognition approaches such as fingerprint recognition or iris recognition, face recognition is considered to be more robust. Unlike fingerprint recognition and iris recognition, which require a high degree of cooperation with users, face recognition is more user-friendly due to its non-invasive process. Face recognition can be deployed in environments where users do not expect to cooperate with systems, such as monitoring systems. Currently, face recognition has been adopted in a variety of applications such as access control, fraud detection, identity authentication and social media. Traditional recognition approaches rely on a combination of features (such as edge and texture descriptors) of manual design and machine learning techniques (such as principal component analysis, linear discriminant analysis, or support vector machines). Since it is difficult for manual design to extract robust features from different changes in unconstrained environments, researchers need to study special approaches for different types of change. A deep learning method based on a convolutional neural network has become a major approach for face recognition, but the design of neural network architecture is quite challenging. Building a neural network that has good recognition performance strongly relies on artificial experience, while the artificial experience comes from accumulation of years of research findings on processing tasks and neural network models by a large number of professionals. However, the lack of such professionals makes it difficult to independently implement the deep learning method based on the convolutional neural network.

SUMMARY

In view of the above-mentioned shortcomings in the prior art, the present invention provides a face recognition method based on an evolutionary convolutional neural network, which solves the problem that the prior art relies on manual labor.

To achieve the above objective, the present invention adopts the following technical solutions. A face recognition method based on an evolutionary convolutional neural network, including the following steps:
S1: generating N convolutional neural network structures by an indirect encoding approach according a variable-length encoding algorithm to obtain an initial population, and setting an iteration counter t=1 and a maximum number T of iterations;
S2: training each of individuals in the initial population, performing a fitness evaluation using face data, and selecting N parents according to a result of the fitness evaluation;
S3: performing a crossover on the parents by using a binary crossover algorithm to obtain N offspring, merging the N parents and the N offspring to form a mixed population, and performing a mutation operation on individuals in the mixed population;
S4: performing a fitness evaluation on the individuals in the mixed population, and applying an environmental selection on the mixed population according to a result of the fitness evaluation of the mixed population to select N new individuals from the mixed population;
S5: determining whether t is equal to T; if t is equal to T, then turning to step S6; if t is not equal to T, using the N new individuals in step S4 as the parents, incrementing the iteration counter t by one, and returning to step S3; and
S6: selecting an individual network with an optimal fitness value from the N new individuals, and inputting a face image to be detected into the individual network with the optimal fitness value to obtain a face recognition result.

Further, a specific step of generating the N convolutional neural network structures by the indirect encoding approach according to the variable-length encoding algorithm to obtain the initial population in step S1 includes:
A1: setting a maximum number of convolutional layers to a, a maximum number of pooling layers to b, and a maximum number of fully-connected layers to c;
A2: using one convolutional layer as an input layer of a convolutional neural network structure, successively randomly adding the convolutional layers or the pooling layers behind the input layer, and setting a kernel size of the convolutional layers or a filter size of the pooling layers;
A3: determining whether the number of the convolutional layers is less than a and the number of the pooling layers is less than b, if the number of the convolutional layers is less than a and the number of the pooling layers is less than b, then returning to step A2, otherwise, turning to step A4;
A4: determining whether the number of the convolutional layers is a, if the number of the convolutional layers is a, then adding the pooling layers until the number of the pooling layers reaches b, and setting the kernel size of the convolutional layers; if the number of the convolutional layers is not a, adding the convolutional layers until the number of the convolutional layers reaches a, and setting the filter size of the pooling layers;
A5: adding c+1 fully-connected layers connected in sequence, and inserting a batch normalization layer behind each of the convolutional layers;
A6: adding a dropout layer behind a last fully-connected layer to obtain an initial convolutional neural network structure; and
A7: generating N initial convolutional neural network structures according to step A1 to step A6, and encoding the initial convolutional neural network structures by the indirect encoding approach to obtain the initial population.

Further, a specific step of encoding the initial convolutional neural network structures by the indirect encoding approach in step A7 includes: encoding the convolutional layers, the pooling layers, and the fully-connected layers in the initial convolutional neural network structures by the indirect encoding approach.

Coding information of the convolutional layers includes: a filter width, a filter height, the number of feature maps, a stride width, a stride height, a convolution type, a standard deviation, and a filter parameter average.

Coding information of the pooling layers includes: a kernel width, a kernel height, a stride width, a stride height, and a pooling type, where the pooling type is a max pooling or an average pooling.

Coding information of the fully-connected layers includes: the number of neurons, a standard deviation of connection weights, and an average of the connection weights.

Further, a specific method of training each of the individuals in the initial population, and performing the fitness evaluation using the face data includes:

B1: collecting a plurality of face image data with an identical size, and dividing the face image data into a training set and a validation set according to a ratio of 7 to 3;

B2: performing face labeling on face image data in the training set by manual labeling to obtain sample labels;

B3: setting the number of training steps to 30 and a learning rate to 0.0001, traversing all training data during each training step, successively sending the face image data in the training set into an individual, calculating a loss function value between predicted outputs of the individual and the sample labels, and optimizing parameters of the individual by using an Adam algorithm to achieve minimizing the loss function value;

B4: training each individual in the initial population according to step B2 to step B3; and B5: inputting the validation set into each trained individual, calculating an accuracy rate and a complexity, and obtaining a fitness value based on the accuracy rate and the complexity.

The fitness value is equal to the accuracy rate minus the complexity.

Further, the step of calculating the accuracy rate in step B5 includes: selecting predicted probabilities of each face output by the individual, selecting a classification with a highest probability as a predicted classification, and determining whether the predicted classification is identical to a real classification of the corresponding face image data, if yes, recording a predicted result as 1, otherwise, recording the predicted result as 0. The accuracy rate is obtained according to the predicted result of the individual on the face image data in the validation set. The accuracy rate P is specifically calculated as:

$$P = \frac{n}{m},$$

where, n represents the number of correct prediction made by the individual on a classification of the face image data in the validation set, and m represents a total number of the face image data in the validation set.

Further, the complexity $P_{complexity}$ in step B5 is the number of the parameters of the individual.

Further, a specific method of selecting the N parents according to the result of the fitness evaluation in step S2 includes:

C1: setting a first threshold $\alpha$ and a second threshold $\beta$;

C2: randomly selecting two individuals from a trained initial population, and determining whether a difference between accuracy rates of the two individuals is greater than $\alpha$, if yes, then selecting one with a larger accuracy rate of the two individuals as a parent; otherwise, turning to step C3;

C3: determining whether a difference between complexities of the two individuals is less than $\beta$, if yes, then selecting one with a larger accuracy rate of the two individuals as the parent; otherwise, selecting one with a smaller complexity of the two individuals as the parent; and C4: selecting the N parents according to step C2 to step C3.

Further, step S3 includes the following sub-steps:

S3.1: successively putting the convolutional layers, the pooling layers and the fully-connected layers into three lists, respectively, according to an arrangement order of network structure layers in a parent;

S3.2: obtaining the three lists of each of the parents according to step S3.1;

S3.3: randomly selecting two parents, pairwise matching the two parents with each other according to the convolutional layers, the pooling layers and the fully-connected layers, and aligning heads of two lists matched with each other;

S3.4: exchanging network structure layers at an identical position in the two lists matched with each other, and putting exchanged network structure layers into corresponding parents according to an order in which the original network structures are removed out of the parents;

S3.5: traversing all of the parents according to step S3.3 to step S3.4 to obtain the N offspring;

S3.6: merging the N parents and the N offspring to form the mixed population; and S3.7: performing an adding operation, a deleting operation or a modifying operation on the individuals in the mixed population to complete the mutation operation on the individuals in the mixed population.

Further, the adding operation comprises: setting a maximum adding number of the convolutional layers, a maximum adding number of the pooling layers, and a maximum adding number of the fully-connected layers, respectively; and randomly adding an identical network structure layer in front of the convolutional layers, the pooling layers or the fully-connected layers until the number of added convolutional layers, the number of added pooling layers, and the number of added fully-connected layers reach the maximum adding number of the convolutional layers, the maximum adding number of the pooling layers, and the maximum adding number of the fully-connected layers, respectively.

The deleting operation comprises: setting a minimum retaining number of the convolutional layers, a minimum retaining number of the pooling layers, and a minimum retaining number of the fully-connected layers, respectively; and randomly deleting a plurality of convolutional layers, a plurality of pooling layers or a plurality of fully-connected layers.

The modifying operation comprises: randomly modifying parameters of a plurality of network structure layers according to a polynomial mutation algorithm.

Further, a specific method of applying the environmental selection on the mixed population to select the N new individuals from the mixed population in the step S4 includes:

D1: selecting 10% individuals with an optimal fitness value from the mixed population to obtain a first batch of new individuals;

D2: selecting 0.8*N new individuals from remaining individuals according to a relaxation binary tournament algorithm to obtain a second batch of new individuals; and D3: merging the first batch of new individuals and the second batch of new individuals to form a population to obtain the N new individuals.

The present invention has the following advantages.

(1) The present invention optimizes the design of convolutional neural network architecture and the initialization of connection weights by using a genetic algorithm and finds an optimal neural network through continuous evolutionary calculation, which has minimal dependence on artificial experience.

(2) The present invention encodes the convolutional neural networks by using a variable-length genetic encoding algorithm, so as to improve the diversity of structures of convolutional neural networks. Additionally, in order to cross over extended chromosomes, structural units at corresponding positions are separately crossed over and then recombined, thereby realizing the crossover of chromosomes with different lengths.

(3) In the environmental selection stage, the present invention first performs elitist selection, and then compares two groups of fitness values of the remaining individuals in the population for further selecting, which ensures the elitist and the diversity.

DETAILED DESCRIPTION OF THE EMBODIMENTS

The specific embodiments of the present invention are described below to facilitate those skilled in the art to understand the present invention. However, it should be noted that the present invention is not limited to the scope of the specific embodiments. For those skilled in the art, as long as various changes are within the spirit and scope of the present invention defined and determined by the appended claims, these changes are obvious, and all solutions that are made taking advantage of the present invention shall fall within the scope of protection of the present invention.

The embodiments of the present invention will be further described below with reference to the drawings.

Figure 1:
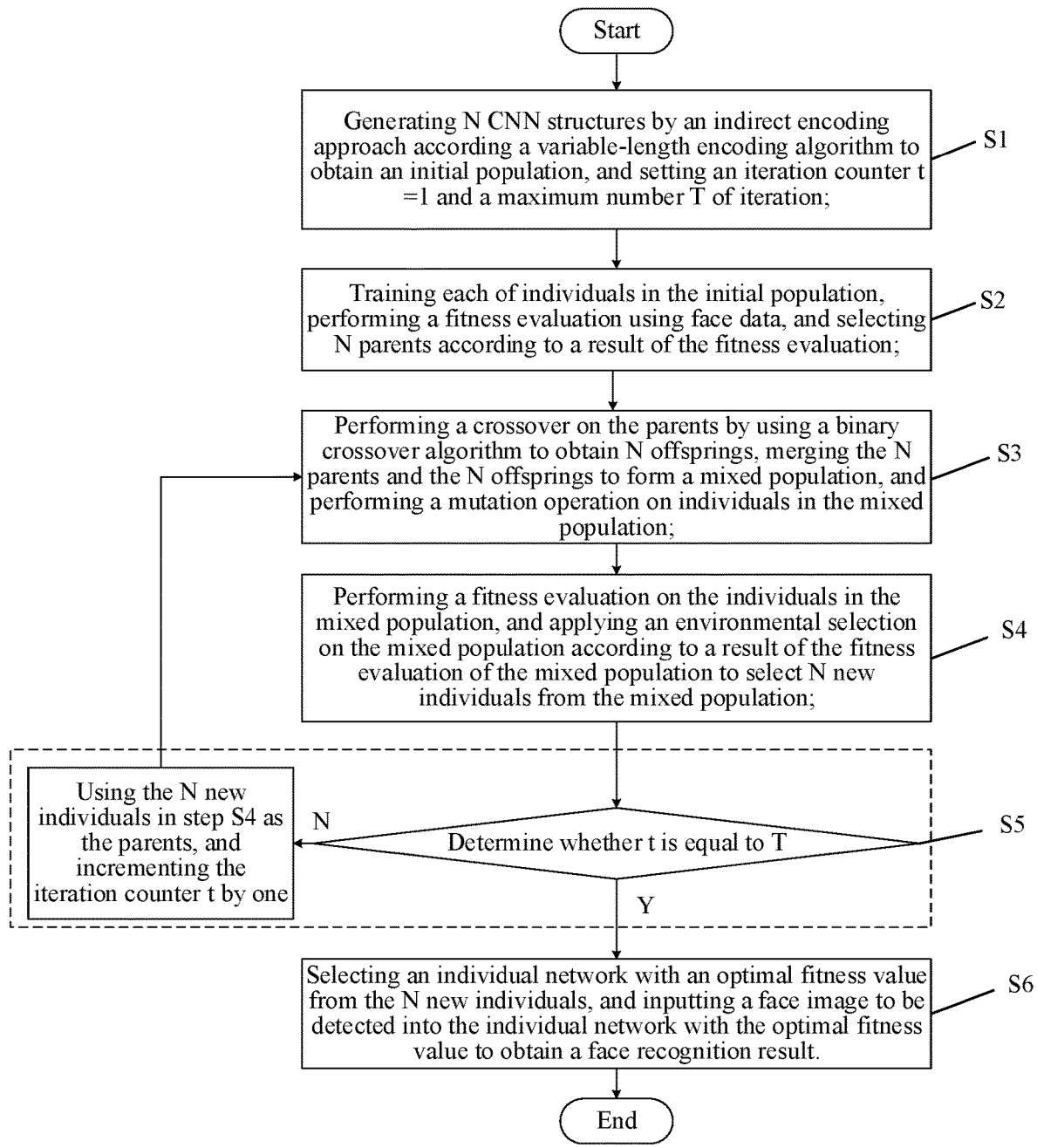
FIG. 1 is a flowchart of a face recognition method based on an evolutionary convolutional neural network according to the present invention.

As shown in FIG. 1, a face recognition method based on an evolutionary convolutional neural network includes the following steps:

S1: N convolutional neural network structures are generated by an indirect encoding approach according a variable-length encoding algorithm to obtain an initial population, and an iteration counter t=1 and a maximum number T of iterations are set;

S2: each of individuals in the initial population is trained, a fitness evaluation is performed using face data, and N parents are selected according to a result of the fitness evaluation;

S3: a crossover is performed on the parents by using a binary crossover algorithm to obtain N offspring, the N parents and the N offspring are merged to form a mixed population, and a mutation operation is performed on individuals in the mixed population;

S4: a fitness evaluation is performed on the individuals in the mixed population, and an environmental selection is applied on the mixed population according to a result of the fitness evaluation of the mixed population to select N new individuals from the mixed population;

S5: it is determined whether t is equal to T; if t is equal to T, then turning to step S6; if t is not equal to T, the N new individuals in step S4 are used as the parents, the iteration counter t is incremented by one, and returning to step S3; and S6: an individual network with an optimal fitness value is selected from the N new individuals, and a face image to be detected is inputted into the individual network with the optimal fitness value to obtain a face recognition result.

Figure 2:
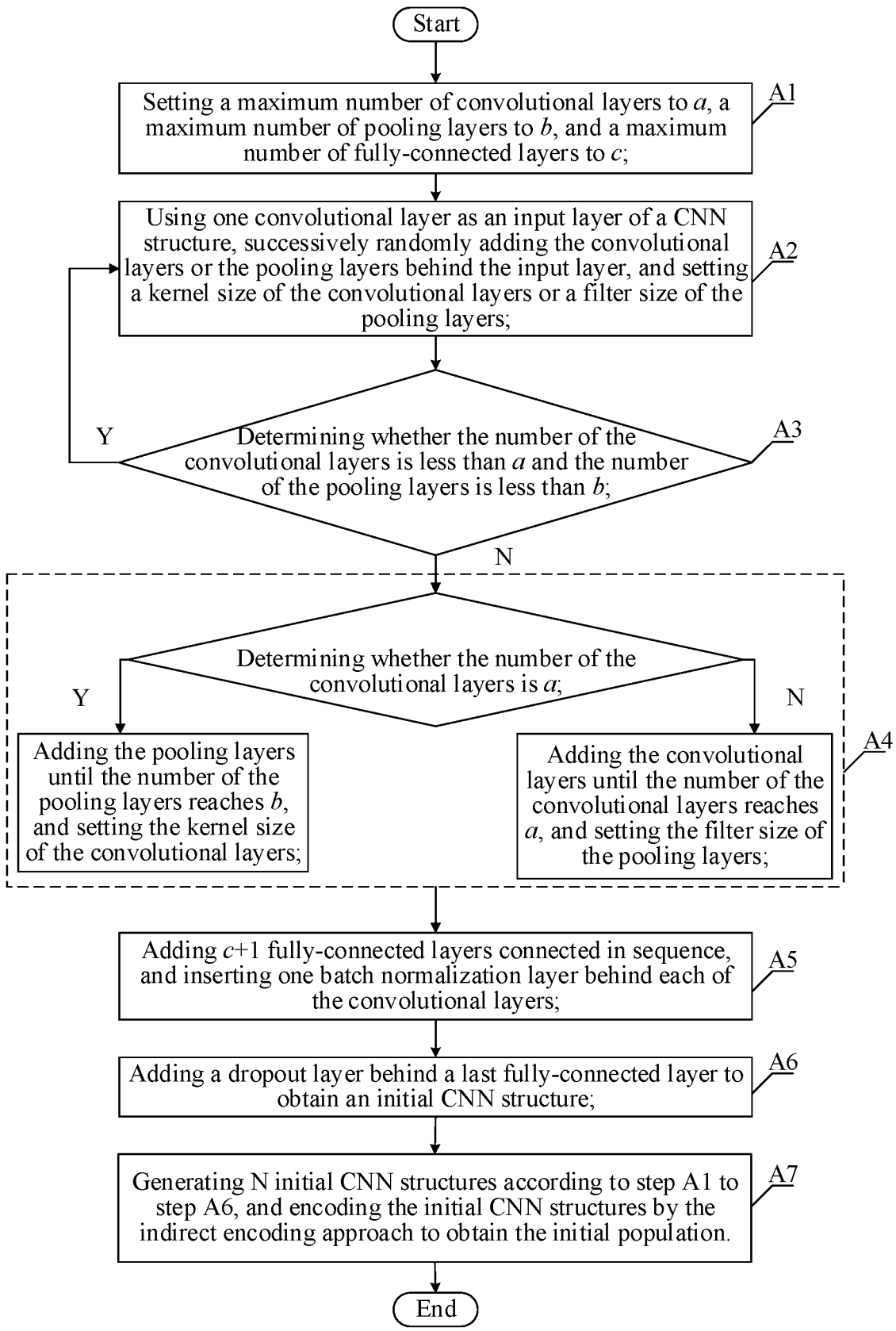
FIG. 2 is a flow chart of obtaining an initial population according to the present invention.

As shown in FIG. 2, the specific step of generating the N convolutional neural network structures by the indirect encoding approach according to the variable-length encoding algorithm to obtain the initial population in step S1 includes:

A1: a maximum number of convolutional layers is set to a, a maximum number of pooling layers is set to b, and a maximum number of fully-connected layers is set to c;

A2: one convolutional layer is used as an input layer of a convolutional neural network structure, the convolutional layers or the pooling layers are successively randomly added behind the input layer, and a kernel size of the convolutional layers or a filter size of the pooling layers is set;

A3: it is determined whether the number of the convolutional layers is less than a and the number of the pooling layers is less than b, if the number of the convolutional layers is less than a and the number of the pooling layers is less than b, then returning to step A2, otherwise, turning to step A4;

A4: it is determined whether the number of the convolutional layers is a, if the number of the convolutional layers is a, then the pooling layers are added until the number of the pooling layers reaches b, and the kernel size of the convolutional layers is set; if the number of the convolutional layers is not a, the convolutional layers are added until the number of the convolutional layers reaches a, and the filter size of the pooling layers is set;

A5: c+1 fully-connected layers connected in sequence are added, and a batch normalization layer is inserted behind each of the convolutional layers;

A6: a dropout layer is added behind a last fully-connected layer to obtain an initial convolutional neural network structure; and A7: N initial convolutional neural network structures are generated according to step A1 to step A6, and the initial convolutional neural network structures are encoded by the indirect encoding approach to obtain the initial population.

The specific step of encoding the initial convolutional neural network structures by the indirect encoding approach in step A7 includes: encoding the convolutional layers, the pooling layers, and the fully-connected layers in the initial convolutional neural network structures by the indirect encoding approach.

Coding information of the convolutional layers includes: a filter width, a filter height, the number of feature maps, a stride width, a stride height, a convolution type, a standard deviation, and a filter parameter average.

Coding information of the pooling layers includes: a kernel width, a kernel height, a stride width, a stride height, and a pooling type, where the pooling type is a max pooling or an average pooling.

Coding information of the fully-connected layers includes: the number of neurons, a standard deviation of connection weights, and an average of the connection weights.

A specific method of training each of the individuals in the initial population, and performing the fitness evaluation using the face data includes:

B1: a plurality of face image data with an identical size are collected, and the face image data are divided into a training set and a validation set according to a ratio of 7 to 3;

B2: face labeling is performed on face image data in the training set by manual labeling to obtain sample labels;

B3: the number of training steps is set to 30, a learning rate is set to 0.0001, all training data are traversed during each training step, the face image data in the training set are successively sent into an individual, a loss function value between predicted outputs of the individual and the sample labels is calculated, and parameters of the individual is optimized by using an Adam algorithm to achieve minimizing the loss function value;

B4: each individual in the initial population is trained according to step B2 to step B3; and B5: the validation set is input into each trained individual, an accuracy rate and a complexity are calculated, and a fitness value is obtained based on the accuracy rate and the complexity, where the fitness value is equal to the accuracy rate minus the complexity.

The step of calculating the accuracy rate in step B5 includes: selecting predicted probabilities of each face output by the individual, selecting a classification with a highest probability as a predicted classification, and determining whether the predicted classification is identical to a real classification of the corresponding face image data, if yes, a predicted result is recorded as 1, otherwise, the predicted result is recorded as 0. The accuracy rate is obtained according to the predicted result of the individual on the face image data in the validation set. The accuracy rate P is specifically calculated as:

$$P = \frac{n}{m},$$

where, n represents the number of correct prediction made by the individual on a classification of the face image data in the validation set, and m represents the total number of the face image data in the validation set.

The complexity $P_{complexity}$ in step B5 is the number of the parameters of the individual.

A specific method of selecting the N parents according to the result of the fitness evaluation in step S2 includes:

C1: a first threshold $\alpha$ and a second threshold $\beta$ are set;

C2: two individuals are randomly selected from a trained initial population, and it is determined whether a difference between accuracy rates of the two individuals is greater than $\alpha$, if yes, then one with a larger accuracy rate of the two individuals is selected as a parent; otherwise, turning to step C3;

C3: it is determined whether a difference between complexities of the two individuals is less than $\beta$, if yes, then one with a larger accuracy rate of the two individuals is selected as the parent; otherwise, one with a smaller complexity of the two individuals is selected as the parent; and C4: the N parents are selected according to step C2 to step C3.

Step S3 includes the following sub-steps:

S3.1: the convolutional layers, the pooling layers and the fully-connected layers are successively put into three lists, respectively, according to an arrangement order of network structure layers in a parent;

S3.2: the three lists of each of the parents are obtained according to step S3.1;

S3.3: two parents are randomly selected, the two parents are pairwise matched with each other according to the convolutional layers, the pooling layers and the fully-connected layers, and heads of two lists matched with each other are aligned;

S3.4: network structure layers at an identical position in the two lists matched with each other are exchanged, and exchanged network structure layers are put into corresponding parents according to an order in which the original network structures are removed out of the parents;

S3.5: all of the parents are traversed according to step S3.3 to step S3.4 to obtain the N offspring;

S3.6: the N parents and the N offspring are merged to form the mixed population; and S3.7: an adding operation, a deleting operation or a modifying operation is performed on the individuals in the mixed population to complete the mutation operation on the individuals in the mixed population.

The adding operation comprises: setting a maximum adding number of the convolutional layers, a maximum adding number of the pooling layers, and a maximum adding number of the fully-connected layers, respectively; and randomly adding an identical network structure layer in front of the convolutional layers, the pooling layers or the fully-connected layers until a number of added convolutional layers, a number of added pooling layers, and a number of added fully-connected layers reach the maximum adding number of the convolutional layers, the maximum adding number of the pooling layers, and the maximum adding number of the fully-connected layers, respectively. The deleting operation comprises: setting a minimum retaining number of the convolutional layers, a minimum retaining number of the pooling layers, and a minimum retaining number of the fully-connected layers, respectively; and randomly deleting a plurality of convolutional layers, a plurality of pooling layers or a plurality of fully-connected layers. The modifying operation comprises: randomly modifying parameters of a plurality of network structure layers according to a polynomial mutation algorithm.

A specific method of applying the environmental selection on the mixed population to select the N new individuals from the mixed population in the step S4 includes:

D1: 10% individuals with an optimal fitness value are selected from the mixed population to obtain a first batch of new individuals;

D2: 0.8*N new individuals are selected from remaining individuals according to a relaxation binary tournament algorithm to obtain a second batch of new individuals; and D3: the first batch of new individuals and the second batch of new individuals are merged to form a population to obtain the N new individuals.

In an embodiment, an individual network with an optimal fitness value, VGG16, VGG19 and GoogleNet Inception V1 are used to recognize face images to be detected, respectively. The recognition results are shown in Table 1.

TABLE 1

| Classifier | VGG16 | VGG19 | GoogleNet Inception V1 | The present invention |
| --- | --- | --- | --- | --- |
| Accuracy Rate | 0.65 | 0.72 | 0.66 | 0.70 |
| Complexity | 134355029 | 139667285 | 15404935 | 17845778 |

As can be seen from Table 1, the individual network evolved from the present invention has an excellent accuracy rate for image recognition as well as a relatively small complexity.

The present invention has the following advantages. The present invention optimizes the design of convolutional neural network architecture and the initialization of connection weights by using a genetic algorithm and finds an optimal neural network through continuous evolutionary calculation, which has minimal dependence on artificial experience. The present invention encodes the convolutional neural networks by using a variable-length genetic encoding algorithm, so as to improve the diversity of structures of convolutional neural networks. Additionally, in order to cross over extended chromosomes, structural units at corresponding positions are separately crossed over and then recombined, thereby realizing the crossover of chromosomes with different lengths. In the environmental selection stage, the present invention first performs elitist selection, and then compares two groups of fitness values of the remaining individuals in the population for further selecting, which ensures the elitist and the diversity.

What is claimed is:

1. A face recognition method based on an evolutionary convolutional neural network, comprising:
    S1: generating N convolutional neural network structures by an indirect encoding approach according a variable-length encoding algorithm to obtain an initial population, and setting an iteration counter t=1 and a maximum number T of iterations;
    S2: training each of first individuals in the initial population, performing a first fitness evaluation using face data, and selecting N parents according to a result of the first fitness evaluation;
    S3: performing a crossover on the N parents by using a binary crossover algorithm to obtain N offspring, merging the N parents and the N offspring to form a mixed population, and performing a mutation operation on second individuals in the mixed population;
    S4: performing a second fitness evaluation on the second individuals in the mixed population, and applying an environmental selection on the mixed population according to a result of the second fitness evaluation of the mixed population to select N third individuals from the mixed population;
    S5: determining whether t is equal to T; when t is equal to T, turning to step S6; when t is not equal to T, using the N third individuals in step S4 as the N parents, incrementing the iteration counter t by one, and returning to step S3; and
    S6: selecting an individual network with a first optimal fitness value from the N third individuals, and inputting a face image to be detected into the individual network with the first optimal fitness value to obtain a face recognition result;
    wherein the step of generating the N convolutional neural network structures by the indirect encoding approach according to the variable-length encoding algorithm to obtain the initial population in step S1 comprises:
        A1: setting a maximum number of convolutional layers to a, a maximum number of pooling layers to b, and a maximum number of fully-connected layers to c;
        A2: using one convolutional layer of the convolutional layers as an input layer of a convolutional neural network structure of the N convolutional neural network structures, successively randomly adding the convolutional layers or the pooling layers behind the input layer, and setting a kernel size of the convolutional layers or a filter size of the pooling layers;
        A3: determining whether a number of the convolutional layers is less than a and a number of the pooling layers is less than b, when the number of the convolutional layers is less than a and the number of the pooling layers is less than b, returning to step A2, when the number of the convolutional layers is equal to or greater than a or the number of the pooling layers is equal to or greater than b, turning to step A4;
        A4: determining whether the number of the convolutional layers is a, when the number of the convolutional layers is a, adding the pooling layers until the number of the pooling layers reaches b, and setting the kernel size of the convolutional layers; when the number of the convolutional layers is not a, adding the convolutional layers until the number of the convolutional layers reaches a, and setting the filter size of the pooling layers;
        A5: adding c+1 fully-connected layers connected in sequence, and inserting a batch normalization layer behind each of the convolutional layers;
        A6: adding a dropout layer behind a last fully-connected layer of the c+1 fully-connected layers to obtain an initial convolutional neural network structure; and
        A7: generating N initial convolutional neural network structures according to step A1 to step A6, and encoding the N initial convolutional neural network structures by the indirect encoding approach to obtain the initial population.

2. The face recognition method according to claim 1, wherein the step of encoding the N initial convolutional neural network structures by the indirect encoding approach in step A7 comprises: encoding the convolutional layers, the pooling layers, and the fully-connected layers in the N initial convolutional neural network structures by the indirect encoding approach; wherein
    coding information of the convolutional layers comprises: a filter width, a filter height, a number of feature maps, a stride width, a stride height, a convolution type, a standard deviation, and a filter parameter average;
    coding information of the pooling layers comprises: a kernel width, a kernel height, a stride width, a stride height, and a pooling type, where the pooling type is a max pooling or an average pooling; and coding information of the fully-connected layers comprises: a number of neurons, a standard deviation of connection weights, and an average of the connection weights.

3. The face recognition method according to claim 1, wherein a method of applying the environmental selection on the mixed population to select the N third individuals from the mixed population in the step S4 comprises:
   D1: selecting 10% second individuals with a second optimal fitness value from the mixed population to obtain a first batch of third individuals;
   D2: selecting 0.8*N third individuals from remaining second individuals in the mixed population according to a relaxation binary tournament algorithm to obtain a second batch of third individuals; and
   D3: merging the first batch of the third individuals and the second batch of the third individuals to form a population to obtain the N third individuals.

4. A face recognition method based on an evolutionary convolutional neural network, comprising:
   S1: generating N convolutional neural network structures by an indirect encoding approach according a variable-length encoding algorithm to obtain an initial population, and setting an iteration counter t=1 and a maximum number T of iterations;
   S2: training each of first individuals in the initial population, performing a first fitness evaluation using face data, and selecting N parents according to a result of the first fitness evaluation;
   S3: performing a crossover on the N parents by using a binary crossover algorithm to obtain N offspring, merging the N parents and the N offspring to form a mixed population, and performing a mutation operation on second individuals in the mixed population;
   S4: performing a second fitness evaluation on the second individuals in the mixed population, and applying an environmental selection on the mixed population according to a result of the second fitness evaluation of the mixed population to select N third individuals from the mixed population;
   S5: determining whether t is equal to T; when t is equal to T, turning to step S6; when t is not equal to T, using the N third individuals in step S4 as the N parents, incrementing the iteration counter t by one, and returning to step S3; and
   S6: selecting an individual network with a first optimal fitness value from the N third individuals, and inputting a face image to be detected into the individual network with the first optimal fitness value to obtain a face recognition result;
   wherein a method of training each of the first individuals in the initial population, and performing the first fitness evaluation using the face data comprises:
   B1: collecting a plurality of face image data with an identical size, and dividing the plurality of face image data into face image subdata of a training set and face image subdata of a validation set according to a ratio of 7 to 3;
   B2: performing face labeling on the face image subdata in the training set by manual labeling to obtain sample labels;
   B3: setting a number of training steps to 30 and a learning rate to 0.0001, traversing the face image subdata in the training set during each training step of the training steps, successively sending the face image subdata in the training set into a first individual of the first individuals, calculating a loss function value between predicted outputs of the first individual and the sample labels, and optimizing parameters of the first individual by using an Adam algorithm to achieve minimizing the loss function value;
   B4: training each first individual of the first individuals in the initial population to obtain each trained first individual according to step B2 to step B3; and
   B5: inputting the validation set into the each trained first individual, calculating an accuracy rate and a complexity, and obtaining a fitness value based on the accuracy rate and the complexity;
   wherein the fitness value is equal to the accuracy rate minus the complexity.

5. The face recognition method according to claim 4, wherein the step of calculating the accuracy rate in step B5 comprises:
   selecting predicted probabilities of each face output by the first individual,
   selecting a classification with a highest probability as a predicted classification, and
   determining whether the predicted classification is identical to a real classification of face image subdata corresponding to the predicted classification,
   when the predicted classification is identical to the real classification, recording a predicted result as 1,
   when the predicted classification is not identical to the real classification, recording the predicted result as 0;
   wherein
   the accuracy rate is obtained according to the predicted result of the first individual on the face image subdata in the validation set; the accuracy rate P is specifically calculated as:

$$P = \frac{n}{m},$$

where, n represents a number of correct prediction made by the first individual on the real classification of the face image subdata in the validation set, and m represents a total number of the face image subdata in the validation set.

6. The face recognition method according to claim 5, wherein a method of selecting the N parents according to the result of the first fitness evaluation in step S2 comprises:
   C1: setting a first threshold $\alpha$ and a second threshold $\beta$;
   C2: randomly selecting two trained first individuals from a trained initial population, and determining whether a difference between accuracy rates of the two trained first individuals is greater than $\alpha$, when the difference between the accuracy rates of the two trained first individuals is greater than $\alpha$, selecting a trained first individual with a relatively large accuracy rate of the two trained first individuals as a parent of the N parents; when the difference between the accuracy rates of the two trained first individuals is equal to or smaller than $\alpha$, turning to step C3;
   C3: determining whether a difference between complexities of the two trained first individuals is less than $\beta$, when the difference between the complexities of the two trained first individuals is less than $\beta$, selecting a trained first individual with a relatively large accuracy rate of the two trained first individuals as the parent; when the difference between the complexities of the two trained first individuals is equal to or greater than β, selecting a trained first individual with a relatively small complexity of the two trained first individuals as the parent; and C4: selecting the N parents according to step C2 to step C3.

7. The face recognition method according to claim 4, wherein the complexity $P_{complexity}$ in step B5 is a number of the parameters of the first individual.

8. A face recognition method based on an evolutionary convolutional neural network, comprising:
   S1: generating N convolutional neural network structures by an indirect encoding approach according a variable-length encoding algorithm to obtain an initial population, and setting an iteration counter t=1 and a maximum number T of iterations;
   S2: training each of first individuals in the initial population, performing a first fitness evaluation using face data, and selecting N parents according to a result of the first fitness evaluation;
   S3: performing a crossover on the N parents by using a binary crossover algorithm to obtain N offspring, merging the N parents and the N offspring to form a mixed population, and performing a mutation operation on second individuals in the mixed population;
   S4: performing a second fitness evaluation on the second individuals in the mixed population, and applying an environmental selection on the mixed population according to a result of the second fitness evaluation of the mixed population to select N third individuals from the mixed population;
   S5: determining whether t is equal to T; when t is equal to T, turning to step S6; when t is not equal to T, using the N third individuals in step S4 as the N parents, incrementing the iteration counter t by one, and returning to step S3; and
   S6: selecting an individual network with a first optimal fitness value from the N third individuals, and inputting a face image to be detected into the individual network with the first optimal fitness value to obtain a face recognition result;
   wherein step S3 comprises the following sub-steps:
      S3.1: successively putting convolutional layers, pooling layers and fully-connected layers into three lists, respectively, according to an arrangement order of network structure layers in a parent of the N parents;
      S3.2: obtaining the three lists of each of the N parents according to step S3.1;
      S3.3: randomly selecting two parents of the N parents, pairwise matching the two parents with each other according to the convolutional layers, the pooling layers and the fully-connected layers, and aligning heads of two lists matched with each other of the three lists;
      S3.4: exchanging the network structure layers at an identical position in the two lists matched with each other to obtain exchanged network structure layers, and putting the exchanged network structure layers into two parents according to an order, wherein the network structure layers are removed out of the two parents in the order;
      S3.5: traversing the N parents according to step S3.3 to step S3.4 to obtain the N offspring;
      S3.6: merging the N parents and the N offspring to form the mixed population; and
      S3.7: performing an adding operation, a deleting operation or a modifying operation on the second individuals in the mixed population to complete the mutation operation on the second individuals in the mixed population.

9. The face recognition method according to claim 8, wherein
   the adding operation comprises: setting a maximum adding number of the convolutional layers, a maximum adding number of the pooling layers, and a maximum adding number of the fully-connected layers, respectively; and randomly adding an identical network structure layer in front of the convolutional layers, the pooling layers or the fully-connected layers until a number of added convolutional layers, a number of added pooling layers, and a number of added fully-connected layers reach the maximum adding number of the convolutional layers, the maximum adding number of the pooling layers, and the maximum adding number of the fully-connected layers, respectively;
   the deleting operation comprises: setting a minimum retaining number of the convolutional layers, a minimum retaining number of the pooling layers, and a minimum retaining number of the fully-connected layers, respectively; and randomly deleting a plurality of convolutional layers, a plurality of pooling layers or a plurality of fully-connected layers; and
   the modifying operation comprises: randomly modifying parameters of a plurality of network structure layers according to a polynomial mutation algorithm.

* * * * *